United States Patent
Friedrichs

(10) Patent No.: US 6,699,430 B2
(45) Date of Patent: Mar. 2, 2004

(54) METHOD AND DEVICE FOR PRODUCING A SINTERED METAL BLANK WITH INTERNALLY DISPOSED HELICAL RECESSES

(76) Inventor: Arno Friedrichs, Kirchwea 7, Mainleus (DE), 95336

(*) Notice: Subject to any disclaimer, the term of this patent is extended or adjusted under 35 U.S.C. 154(b) by 31 days.

(21) Appl. No.: 10/093,467

(22) Filed: Mar. 11, 2002

(65) Prior Publication Data

US 2002/0140125 A1 Oct. 3, 2002

Related U.S. Application Data

(63) Continuation of application No. PCT/EP00/08603, filed on Sep. 2, 2000.

(30) Foreign Application Priority Data

Sep. 9, 1999 (DE) .......................................... 199 42 966
Aug. 17, 2000 (DE) .......................................... 100 40 309

(51) Int. Cl.⁷ ................................................ B22F 3/20
(52) U.S. Cl. ........................ 419/3; 419/36; 419/41; 264/629; 264/632; 264/669; 425/78; 425/328; 425/334
(58) Field of Search ............................... 419/3, 41, 36; 264/629, 632, 669; 425/78, 328, 334

(56) References Cited

U.S. PATENT DOCUMENTS 4,881,431 A * 11/1989 Bieneck .................... 76/108 R
5,438,858 A * 8/1995 Friedrichs ..................... 72/260

FOREIGN PATENT DOCUMENTS

| DE | 1750203 U | 8/1957 |
|----|-----------|--------|
| EP | 0173675 A1 | 3/1986 |
| EP | 0465946 A1 | 1/1992 |
| EP | 0852169 A2 | 7/1998 |
| GB | 1533100 | 11/1978 |

OTHER PUBLICATIONS

Patent Abstracts of Japan, vol. 16, No. 553, Nov. 24, 1992, Manufacture of drill and end mill with oil hole.

Patent Abstracts of Japan, vol. 12, No. 292, Aug. 10, 1988, Extrusion Molding Method for Powder Alloy.

ABC Technik und Natur–Wissenschaft, Jul. 25, 2000, p. 1198.

* cited by examiner

Primary Examiner—Daniel J. Jenkins
(74) Attorney, Agent, or Firm—Jacobson Holman PLLC

(57) ABSTRACT

A method of producing a substantially regular cylindrical body that consists of a deformable material, especially a sintered metal blank. The blank is provided with an interior helical recess. The blank is first produced with a substantially linear course of the interior recess, for example by extrusion. The body is cut to a defined length and is subjected to a rolling movement by a friction surface while being supported across its entire length on a support. The speed of the rolling movement changes in a linear and continuous manner across the length of the body, thereby regularly twisting the body.

25 Claims, 7 Drawing Sheets

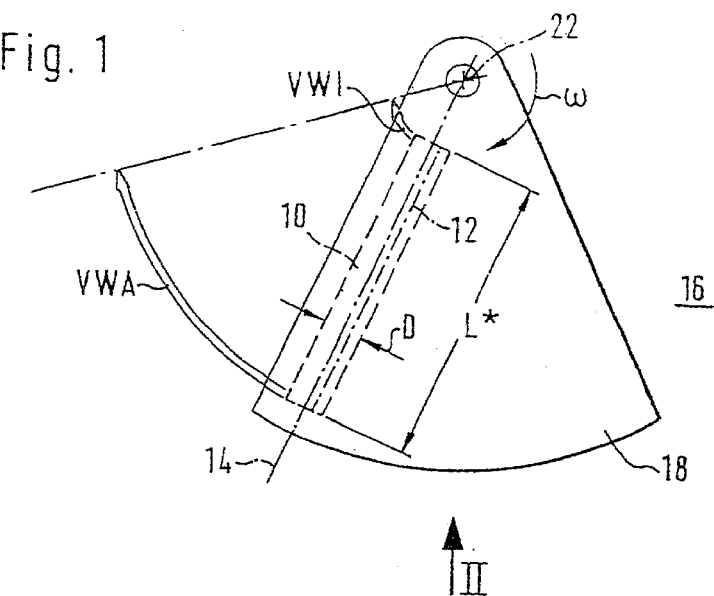
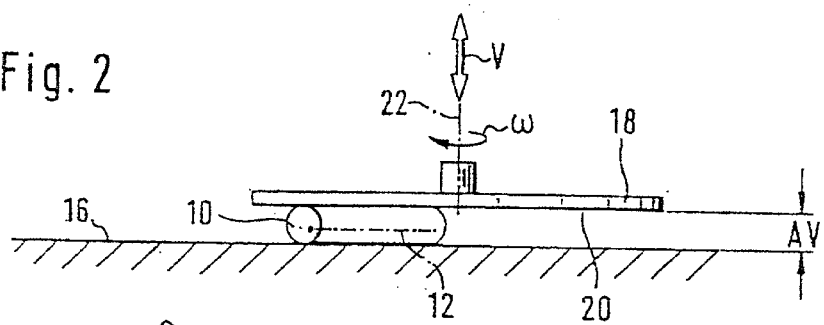
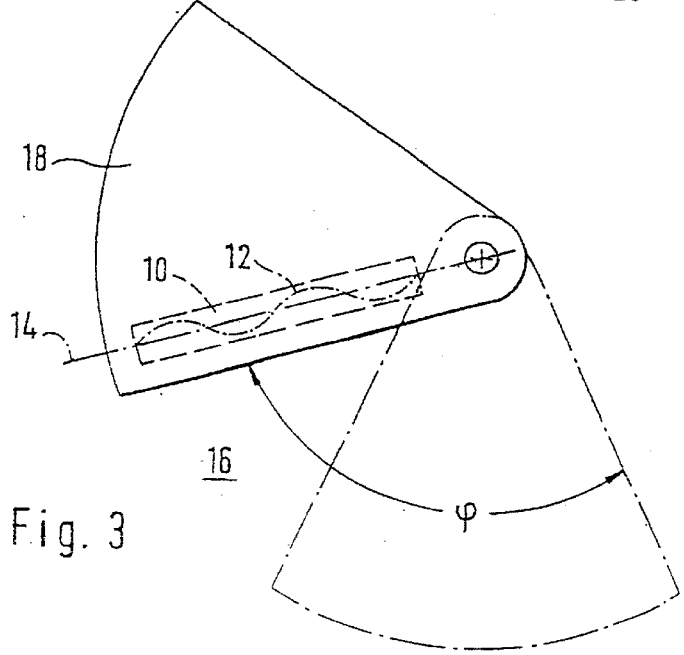

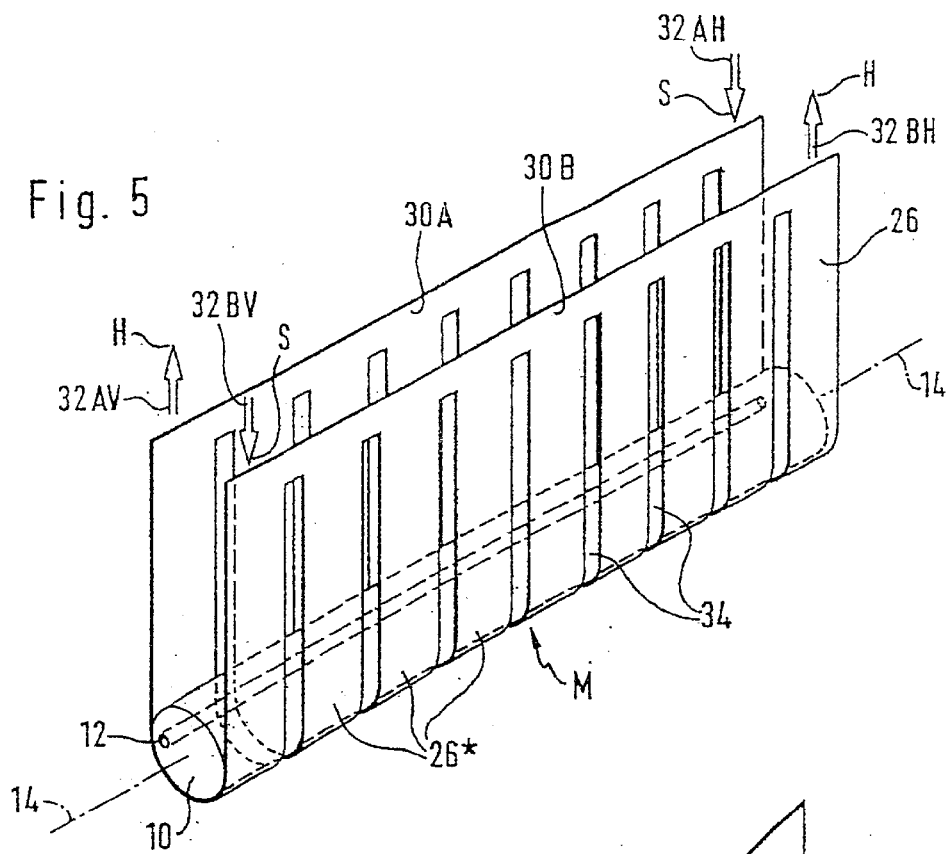
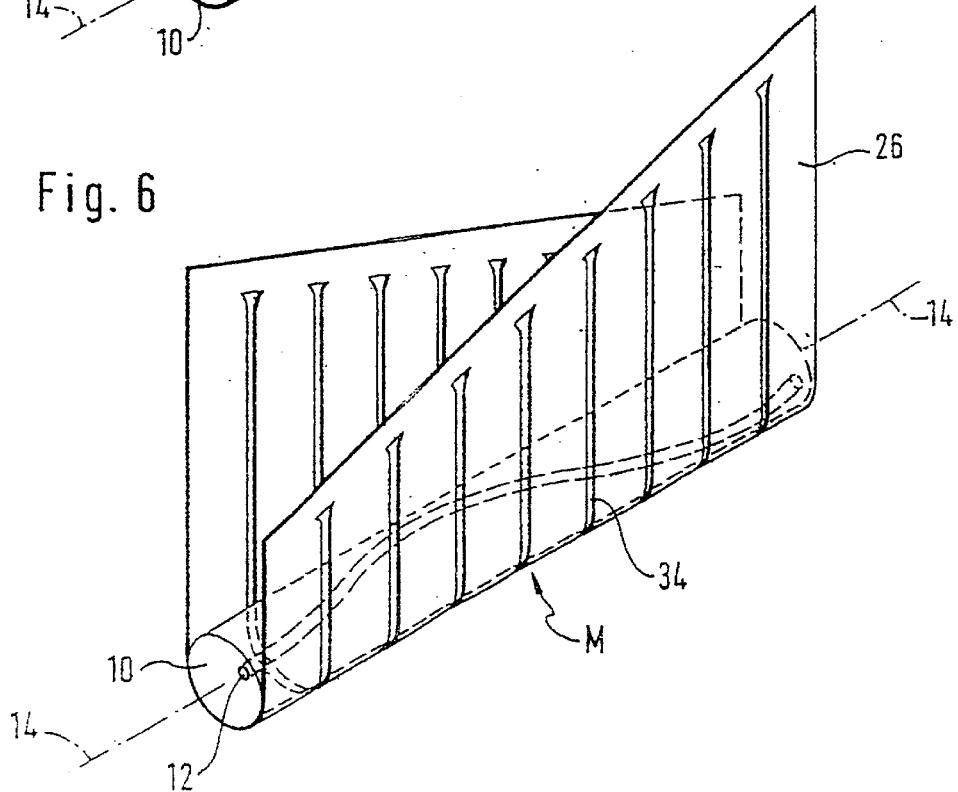

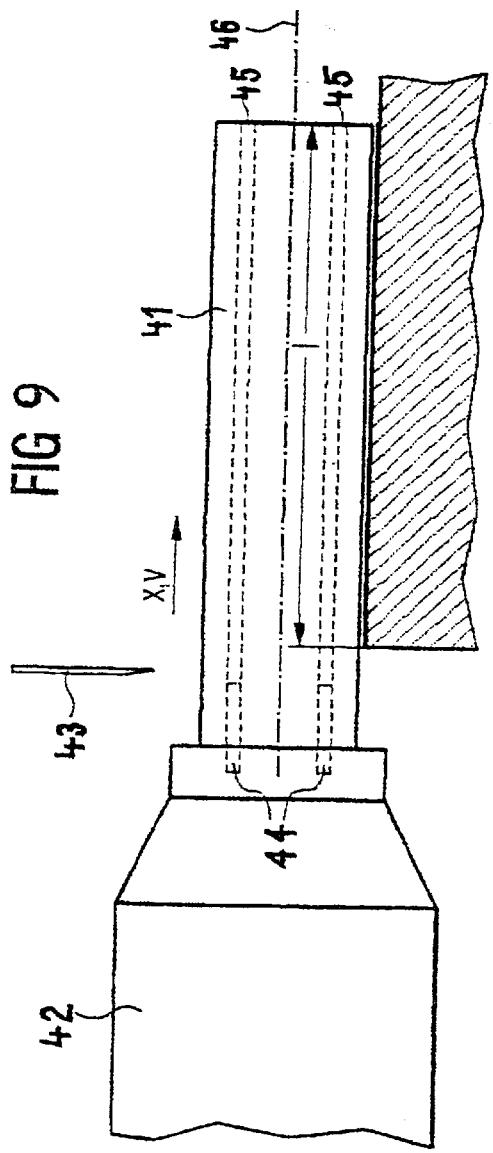
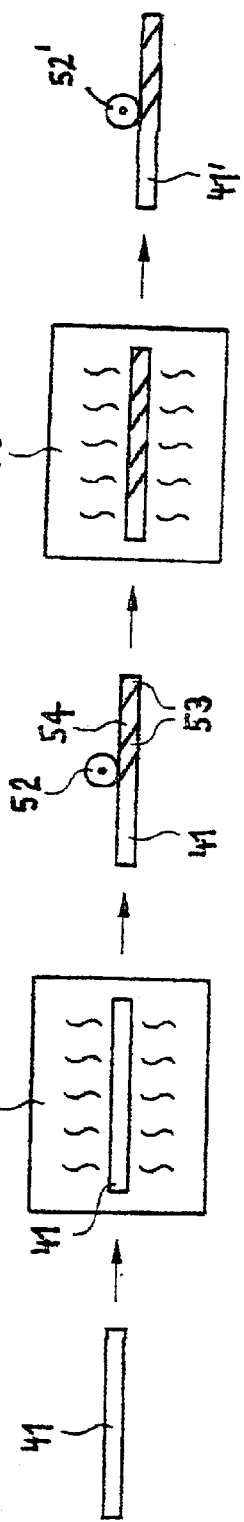

METHOD AND DEVICE FOR PRODUCING A SINTERED METAL BLANK WITH INTERNALLY DISPOSED HELICAL RECESSES

This is a continuation of PCT/EP00/08603 filed Sep. 2, 2000 and published in German.

The invention relates to the method and a device for producing a substantially circularly cylindrical body, particularly a sintered metal blank, which consists of plastic material and which has at least one helical internal recess extending in the interior of the body, according to the introductory part of patent claim 1 or of patent claim 12. In addition, the invention relates to a sintered rod produced by the method according to the invention.

Such bodies are required particularly in the manufacture of drilling tools or drilling tool inserts of hard metal or ceramic materials. Through the helical course of the at least one internal recess, which serves in the finished drilling tool for the feed of coolant or lubricant to the cutting region, the drilling tool can be furnished with helical cutting grooves which are often of advantage for the provision of favourable cutting and material removal characteristics and consequently are desired.

It has previously been attempted to produce such sintered metal blanks or ceramic blanks by an extrusion method, in that the material consisting of sintered metal powder or ceramic powder and binder is forced through an extrusion nozzle which has a cross-section corresponding to the desired blank cross-section and further has at least one internally disposed core in the form of a pin which on extrusion of the plasticised material serves for formation of the internal recess extending through the entire blank.

The material issuing from the extrusion nozzle is usually very pressure-sensitive, i.e. the issuing blank deforms extremely easily in the case of external application of force. Since such deformations are no longer reversible and thus lead to blanks which are unusable at least in sections, it has been attempted to further develop the extrusion process so that the blank already has the helically extending cooling channels when issued from the extrusion nozzle. According to one proposal this is achieved in the manner that helically extending guide strips, which impose a twist motion on the issuing plastic material, are mounted at the inner circumference of the extrusion nozzle. Flexible threads with a cross-section corresponding with the cross-section of the internal recess to be produced are fastened in the cross-section of the extrusion nozzle, wherein the threads extend up to the outlet of the nozzle mouthpiece. Due to the flexibility of the threads these can follow the swirl motion or the swirl flow of the plastic material and thus generate the at least one internally disposed cooling channel in the blank.

According to a further proposal the nozzle mouthpiece and/or a hub formed in propeller shape, to which the aforesaid flexible or pliable threads are fastened, is set into rotary motion during the extrusion process, whereby again an externally smooth blank with internally disposed helical channels or recesses could be produced.

In the production of such tool blanks it is important that the angle of inclination of the at least one helical internal recess is kept constant over the entire length of the blank and within closely toleranced limits. This is required because regular cutting grooves are ground into the tool blank after the sintering process. This grinding is carried out by largely automated machines, so that in the case of imprecise production of the helical internal recesses an uncontrolled high reject rate can result. In that case it has to be taken into consideration that tools with fully hardened metal cutting parts are used inter alia because the high loading capability of the material, particularly the torsional stiffness, has to be utilised. In order to ensure this the internal recess must not extend too close to the cutting groove, which cannot, however, be effectively excluded in the case of inaccurate production of the helical internal recess. In the case of the afore-described attachments for production of blanks with internally disposed helical recesses it is accordingly necessary to monitor as accurately as possible the extrusion tool and/or the sintering devices for the extrusion worm or—if present—for the twist-generating bodies during the extrusion process and to adapt to the material throughput. This has the consequence that relatively lengthy changeover and setting times are required at the extrusion tool with the result that conventional methods are economically usable primarily for large batch production. Disproportionately high machine setting costs result for small batch production or for production of drilling tools with greater nominal diameters, whereby the economics of the production method are called into question.

The invention accordingly has the object of creating a method and a device of the aforesaid kind by which the blank or blanks of the kind described in the introduction can be produced more economically and, as before, with high precision.

This object is met with respect to the method by the features of patent claim 1 and with respect to the device by the features of patent claim 12.

According to the invention the blank is produced as before in an extrusion process, which is distinguished by a high economy by virtue of high possible throughput rates. The extrusion is carried out so that the at least one inwardly disposed recess is extruded rectilinearly, which has the advantage that the production parameters for the extruding, i.e. the extrusion speed, the material throughput, etc, no longer have an effect on the course of the internally disposed recesses. Instead, a body extruded with substantially rectilinear internal recesses is cut to a predetermined length, i.e. cut to length, and subjected in the cut-to-length state to a special deforming process which is based on the principle of a rolling motion engaging the extruded rod over the entire length thereof. The arrangement is in that case such that the speed of the rolling motion changes linearly and constantly over the length of the extruded rod or body, wherein the inclination of the helically extending internal recess is determined by way of the gradients of the speed distribution of the rolling motion. With the method according to the invention the extruded body is uniformly twisted over its entire length and with maintenance of favourable, i.e. constant, support relationships, wherein a minimal deformation of the blank cross-section results due to the rolling motion taking place in that case. The consistency of the extruded extrusion material is thus of benefit to the attaching in accordance with to the invention. The extruded extrusion material is uniformly of viscous consistency so that by virtue of the friction surface arrangement a largely slip-free entrainment of the outer surface of the extruded blank is ensured. The accuracy of the course of the at least one internally disposed helical recess can thus be kept to a particularly high level.

Advantageous embodiments of the method and of the device for production of the substantially circularly cylindrical blank body with a helical internal recess are described in the subclaims.

It has proved that with support of the blank along a line it is already possible to produce the at least one helical cooling channel without unacceptably high deformations of the blank cross-section. A particularly simple device for performance of this development in terms of method forms the subject of claims 13 and 14. Such a device merely requires a support surface and a surface mounted parallel thereto to be pivotable about an axis perpendicular to the support. The inclination of the at least one helical internal recess can be determined by way of the absolute magnitude of the relative pivot angle between the support and the friction surface arrangement. This inclination is directly proportional to the size of the pivot angle.

The deformation of the extruded blank during twisting can be kept within even closer limits by the development of the method and the device according to claims 4 and 15. The support of the extruded blank during twisting preferably takes place with a looping angle of substantially 180°, wherein in this case the external forces due to gravitational force can be kept to a minimum. A particularly simple construction of the device with a minimum of components and in that case at the same time a particularly gentle support of the deformation-sensitive extruded blank results with the development of the device according to patent claim 17. This device is accordingly suitable in particular measure for extrusion materials with a high proportion of plasticiser.

Since the blank tends to shorten during twisting it is of advantage if the surface formed from the film material or textile material is composed of a plurality of part surfaces which are disposed in a line axially along the axis of the body and between each of which a respective gap is provided. The film material or textile material can thus accompany the shortening of the blank rod without excessive force action on the blank, which is of further benefit to the production accuracy of the at least one internally disposed cooling channel.

If the drive device engages the side edges of the film material or textile material in accordance with claim 21 then a comparatively wide scope is created for the design of the drive device. The drive device can, through appropriate selection of the length of the film material or textile material or of a corresponding fabric, be placed in a desired region above the fabric bend, i.e. above the blank to be reshaped. Thus, many possibilities for the accommodation of a drive device are left to the constructer.

It has proved that in the case of use of a fabric connected to the side edges, four raising and lowering drives engaging at the corners are sufficient in order to uniformly twist the extruded blank over the entire length. Stepping motors, which are preferably program-controlled, are preferably used as drive units. The deforming can thus be set in simple manner and, for example, adapted to different nominal diameters of the drilling tool to be produced, whereby a minimum of re-equipping effort is needed.

Further advantageous embodiments are the subject of the remaining subclaims.

A number of embodiments of the invention are explained in more detail in the following by reference to schematic drawings, in which:

FIG. 1 shows a plan view of a first embodiment of the device for producing a sintered metal blank, which consists of a plastic material, with an internally disposed helical recess;

FIG. 2 shows the view corresponding to II in FIG. 1;

FIG. 3 shows, in a view corresponding to FIG. 1, the device after twisting of the extruded blank;

FIG. 5 shows a perspective view of the device according to FIG. 4A or FIG. 4B before the twisting process of the blank;

FIG. 6 shows a view, which corresponds with FIG. 5, of the device after the twisting process;

FIG. 9 shows, schematically, an extrusion of a pasty sintered material;

FIG. 10 shows a front view of the extruded pasty sintered material;

Figure 4A:
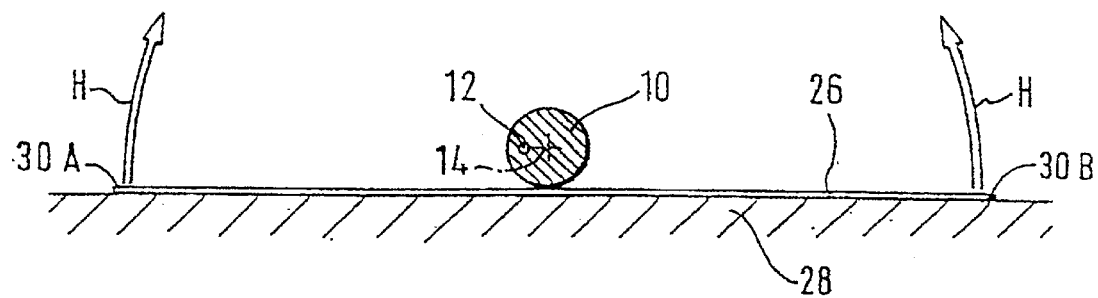
FIG. 4A shows a schematic view of a further device for producing a sintered metal blank provided with at least one internally disposed helical recess, in a pre-production phase.

A sintered metal blank, which is cut to a predetermined length L*, i.e. cut to length, and which consists of, for example, a hard metal powder with a kneaded-in binder or adhesive, is denoted by the reference numeral 10 in FIGS. 1 to 3. This sintered metal blank is produced by, for example, the extrusion method and in particular in such a manner that it has a rectilinear and continuous internal recess 12 which is illustrated in the figures by a dot-dashed line and which extends parallel to the centre axis 14 of the circularly cylindrical blank 10.

The production of the sintered metal blank is preferably carried out by the extrusion method with the use of an extrusion nozzle with a suitable core. The blank 10 has a comparatively soft consistency so that handling, for example, transport, has to be carried out very carefully in order to prevent irreversible deformations. Accordingly, the blank is preferably guided on an air cushion directly after exit from the extrusion nozzle and conducted onto the support 16 which is shown in the figures and which in FIGS. 1 and 3 coincides with the drawing plane. Due to the consistency of the extrusion material the blank is viscous on its outer side so that a good adhesion with the support surface 16 results.

In order to deform the blank 10 in such a manner that the rectilinear internal recess according to FIG. 1 or 2 is reshaped into a helical recess, the arrangement is as follows:

A circle-segment disc 18 with a friction surface 20 at the base is arranged parallel to the planar support surface 16 at the vertical spacing AV. The circle-segment disc 18 is rotatable about an axis 22 which extends perpendicularly to the surface of the support 16 or to the friction surface. The vertical spacing AV between the surfaces 16 and 20 is preferably adjustable, as indicated by the double arrow V in FIG. 2. This vertical spacing AV corresponds with the diameter D of the blank 10.

As shown in FIG. 1, the blank 10 is placed on the support 16 in such a manner that its longitudinal axis 14 intersects the rotational axis 22 of the circle-segment disc 18. Subsequently, the circle-segment disc is lowered in controlled manner so that it contacts the blank 10 along a line which is offset diametrally relative to the base contact line of the blank 10 with the support 16. This orientation is shown in FIGS. 1 and 2.

The circle-segment disc 18 is now pivoted at an angular speed ω. Due to the friction contact between the surface 20 of the circle-segment disc 18 and the blank 10 the blank is entrained in that it rolls on the surface of the support 16 at a speed which changes linearly and constantly along the axis of the blank 10. The rolling speed at the inner end of the blank 10 is denoted by VWI and the rolling speed of the outer end of the blank 10 is denoted by VWA. If the segment disc 18 thus runs through a specific pivot angle φ a linear distribution of the rolling path results along the rod-like blank 10 with the consequence that the circularly cylindrical blank 10 is twisted during the rolling motion and, in particular, in such a manner that an angle of inclination of the twisting, and thus an angle of inclination of the helical internal recess 12, results which is directly proportional to the pivot angle φ.

The circle-segment disc 18 is preferably kept in contact with the rod-like blank 10 with the smallest possible support force and, in particular, during the entire twisting process, i.e. during the entire pivotation about the pivot angle φ (see FIG. 3). It can be of advantage here to operate with pressure sensors which act on the raising and lowering device, which is not illustrated in more detail, for the circle-segment disc 18.

It is clear from the foregoing description that in the first embodiment a linear support of the sintered metal blank 10 is present during the twisting process. In the following an embodiment is described in which the support during the twisting takes place over an area. For this purpose reference is made to FIGS. 4 to 6.

Figure 4B:
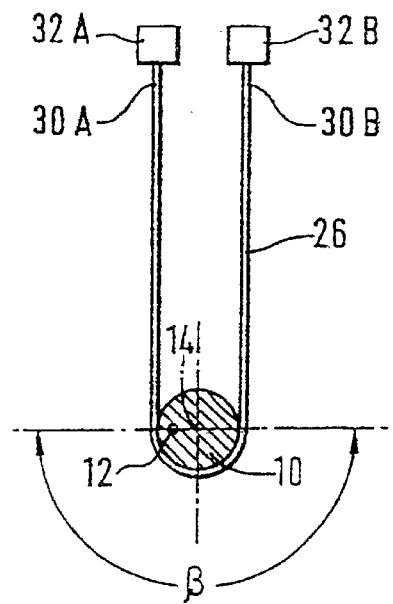
FIG. 4B shows the device according to FIG. 4A in a second pre-production step.

The twisting device according to the second embodiment essentially consists of a pliable or flexible film material or textile material 26 which is initially placed flat on a base 28. The plastic blank 10, which is, for example, extruded and is again furnished with a rectilinear internal recess 12, is subsequently placed on the film material or textile material 26. If—as indicated in FIG. 4A by the arrow H—the side edges 30A and 30B are now struck upwardly then the state according to FIG. 4B is adopted. In that case the film material or textile material 26, which in the simplest embodiment can be formed as a fabric, loops around the blank 10 over a looping angle β of 180°. The blank 10 thus hangs in the fabric 26, which adopts the shape of a 'U'.

Drive devices 32A and 32B which will be described in more detail in the following with reference to FIGS. 5 and 6, engage at the ends 30A and 30B of the fabric 26:

Two drive devices in the form of lifting and lowering drives, which are denoted by 32AV and 32AH or by 32BV or by 32BH, engage on each side of the fabric 26. These drive devices are disposed at the corners of the fabric or of the film material or textile material 26. The drive now takes place in the manner that the adjacent corners of the fabric 26 are raised or lowered in opposite sense, as indicated by the arrows H and S in FIG. 5. Since the blank 10 is suspended in the fabric 26, it is subjected also in this case and with the assistance of the gravitational force of the blank 10 to a rolling motion, the magnitude of which changes linearly and constantly over the length of the blank 10. The arrangement is preferably such that the rolling motion is zero in the centre M of the blank 10. The rolling motion is produced in the manner that the support, which is formed by the fabric 26, under the blank 10 is so moved away that the extent of displacement between the support 26 and the blank 10 over the length of the blank 10 follows a linear distribution. In other words, through the afore-described drive motion of the film material or textile material 26 the effect results that considered in a plane perpendicular to the longitudinal axis 14 of the blank 10 the tangential movement of the fabric 26 with respect to the blank 10 linearly changes along the axis thereof, wherein in the illustrated embodiment this tangential movement is zero at the centre M of the blank 10.

FIG. 6 shows the state of the twisting device and of the blank 10 after twisting has been carried out. The front left corner of the fabric 26 and the back right corner are lifted up, whilst the other two corners were lowered. The internally disposed channel 12 illustrated in FIG. 5 to be rectilinear is helically twisted in the state according to FIG. 6. The extent of twisting is determined by the extent of raising and lowering movement in correspondence with the arrows H and S. Step motors, which are program-controlled in suitable manner, are preferably used for the raising and lowering drives at the corners of the film material or textile material 26, so that a rapid adaptation to different parameters to be observed in the production of the blank can be undertaken.

Since the blank 10 tends to shorten during the twisting, the film material or textile material—as shown in FIGS. 5 and 6—is so designed that it can accompany the shorting without significant reaction force effect on the body 10. For this purpose a number of axially displaced slots 34 are provided in the film material or textile material 26 and, in particular, in such a manner that still interconnected side edges 30A and 30B continue to be present. The slots 34 thus enable—as shown in FIG. 6—a contraction, which is free of reaction force, of the film material or textile material 26, whereby undesired deformations of the blank 10 and thus dimensional deviations are effectively excluded.

Figure 7:
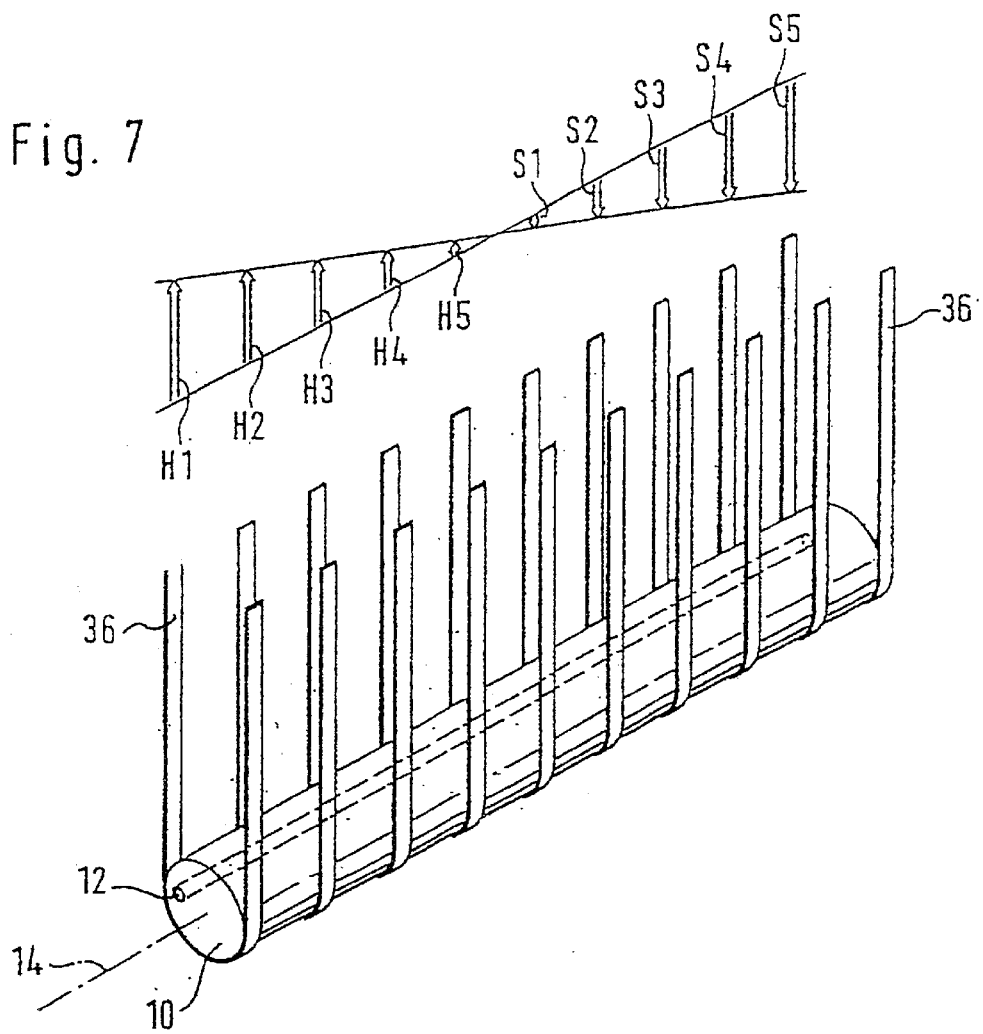
FIG. 7 shows a view, which is similar to FIG. 5, of a third embodiment of the device for producing a substantially circularly cylindrical sintered metal blank, which consists of plastic material, with a helical internal recess extending in the interior of the body.

In FIG. 7 there is indicated a variant of the device for twisting the sintered metal blank 10 produced with rectilinear internal recesses. In departure from the embodiment according to FIGS. 5 and 6 there is used here a plurality of strips 36 which are disposed at an axial spacing relative to one another and with each of which there is associated a respective separate drive in the form of a raising or lowering unit. The drive of the strips 36 takes place, similarly to the embodiment according to FIGS. 5 and 6, in such a manner that a linear movement distribution along the blank 10 results. This movement distribution is indicated in FIG. 7 by the arrows H1 to H5 or S1 to S5.

Figure 8:
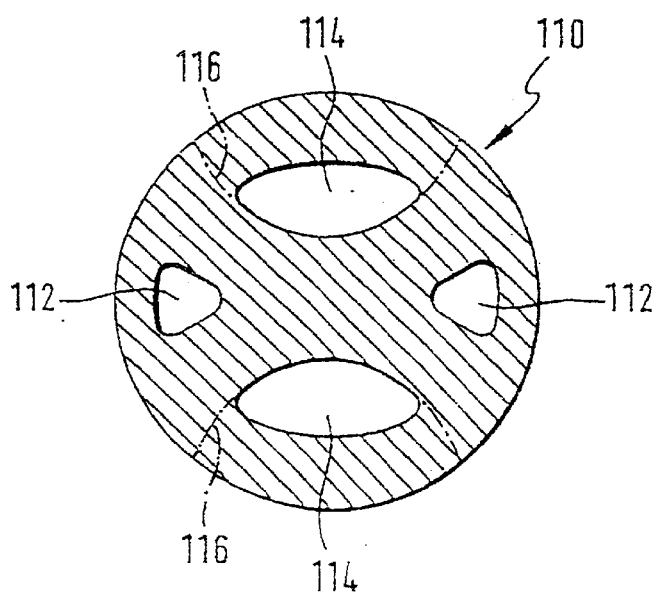
FIG. 8 shows a representation of a modified cross-section of the sintered metal blank.

In departure from the previously described embodiments it is obviously possible to undertake modifications without departing from the concept of the invention. Thus, obviously also other drive devices can be used as long as the aforedescribed effect is achieved. Moreover, in the case of the example shown in FIG. 1 the rod 10 can also be placed so that the rod end extends beyond the rotational centre point 22, wherein a circular plate is then present as the part 18. In addition, the blank can have different cross-sectional forms, in particular it can also have a cross-sectional form slightly departing from the circular shape. Whilst the described forms of embodiment of the blank 10 are shown with only one internal recess, it is obviously also possible to provide several internal recesses of different shape. FIG. 8 shows a possible cross-sectional design with two internal recesses 112 which shall form, in the later tool, the channels for the feed of coolant or lubricant to the cutting region. Recesses which are larger in cross-section and which are disposed so that they lie in the profile of the cutting groove 116 which is to be ground in later and is illustrated by dot-dashed lines, are denoted by the reference numerals 114. In this design, hard metal can be saved and the metal volume to be removed during grinding in of the cutting grooves 116 can be kept smaller. Sufficient material still remains radially outwardly of the recess 114 in order to keep the deformation resistance during rolling of the blank 110 to such magnitude that irreversible deformations are excluded.

The afore-described method and the device belonging thereto can obviously also be used when the course of the internally disposed cooling channel in the extruded sintered metal blank simply has to be corrected. The procedure is also not restricted to the processing of blanks which consist of hard metal or ceramic. It is usable on any material which exists with plastic consistency and accordingly has a very high sensitivity to deformation. Finally, it is also not necessary for the looping angle β to amount to 180°. It is also conceivable to operate with looping angles which are substantially smaller. In this case it is merely necessary to operate with a flexible surface which loops the body in a section and is appropriately driven.

The invention thus creates a method and a device for producing a substantially circularly cylindrical body, particularly a sintered metal blank, which consists of plastic material and which has at least one helical internal recess extending in the interior of the body. For the avoidance of excessive retooling effort for changeover of a production batch the body present with plastic consistency is initially produced, preferably extruded, with a substantially rectilinear course of the internal recess. The body is subsequently cut to a defined length and finally subjected, whilst supported over its entire length on a support, by means of a friction surface arrangement to a rolling motion, the speed of which changes linearly and constantly over the length of the body so that the body is uniformly twisted.

A further embodiment of the invention in which the cross-section of the internal recesses or channels is non-circular is described by reference to the following figures.

According to FIG. 9 a pasty sintered material 41 is extruded by an extruder head 42 which is illustrated only schematically. The pasty sintered material 41 consists of a steel powder, hard metal powder or ceramic powder, mixed with a binder. The extrusion is carried out purely linearly in an extrusion direction x at a substantially constant extrusion speed v. When the extruded strand of the sintered material 41 has a sufficient length l it is cut to length by means of a cutter 43. The cutting to length is carried out in that case selectably manually or automatically.

Shaped bodies 44, which are illustrated by dashed lines, are retained in the extrusion head 42. In that case according to FIG. 9 two shaped bodies 44 are present. However, a greater or lesser number of shaped bodies 44 could also be present. Channels 45 are formed in the sintered material 41 by means of the shaped bodies 44 during the extruding. The channels 45 extend parallelly, but eccentrically, to a rod axis 46. The rod axis 46 is the gravitationally central axis of the extruded sintered material 41.

Figure 11:
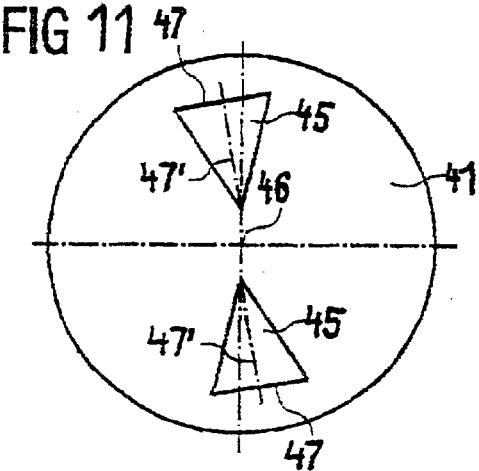
FIG. 11 shows a twisting device from the side.

According to FIG. 11 the channels 45 have channel cross-sections which are non-circular. According to the embodiment they are, for example, triangular. Moreover, they have outer edges 47 and longitudinal axes 47'. Neither the outer edges 47 nor the longitudinal axes 47' run concentrically to the rod axis 46. As apparent, the channels 45 are formed identically to one another and are arranged offset relative to the rod axis by a rotational angle. The rotational angle in that case results from 360° divided by the number of channels 45. In the present case it thus amounts to 180°.

Figure 12:
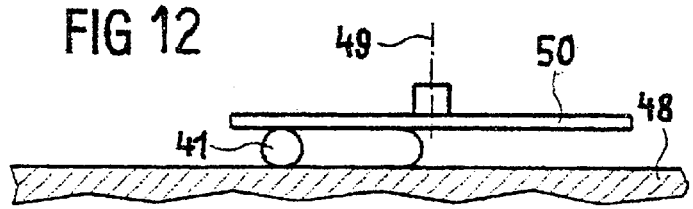
FIG. 12 shows the twisting device of FIG. 11 from above.
Figure 13:
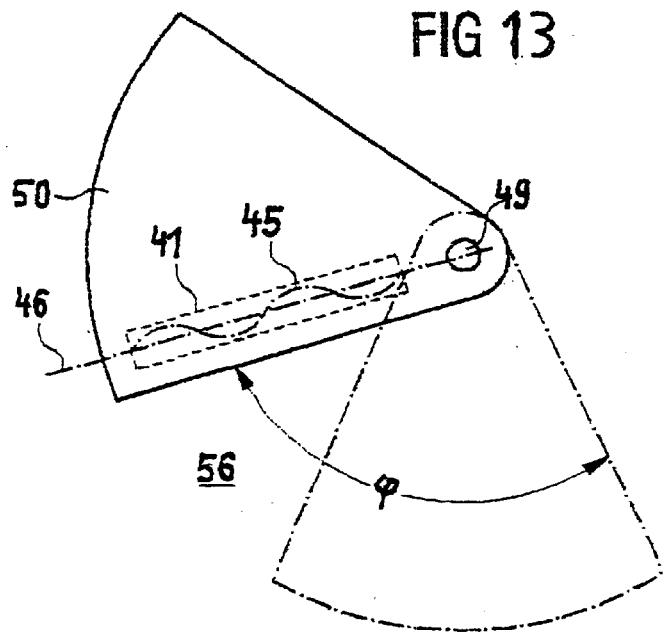
FIG. 13 shows a part method sequence of the production method.

The sintered material 41 is still readily plastically deformable after the cutting to length. According to FIG. 12 it is therefore placed on a flat support 48 and, in particular, in such a manner that it is arranged radially relative to the axis 49 of rotation of a turntable 50. The turntable 50 is then—see also FIG. 13—lowered onto the sintered material 41 cut to length and pivoted through a pivot angle φ. The extruded sintered material 41 is thereby twisted over the rod length l with a constant twist.

The twisted sintered material 41 is then—see FIG. 10—introduced into a drying oven 51 and dried there. Chip spaces 53 are thereafter formed in the dried sintered material 41 by means of a grinding disc 52. Rod fields 54 thereby arise between the chip spaces 53 as seen in the rod cross-section. The sintered material 41 thus prepared is then fed to a sintering oven 55 in which it is sintered into a sintered rod 41'.

A further grinding disc 52' is arranged behind the sintering oven 55. A subsequent processing of the chip spaces 53 is carried out by means of this grinding disc 52'. It is alternatively also possible that the chip spaces 53 are formed in the then already sintered sintered rod 41' only by means of the grinding disc 52'. The forming of the chip spaces 53 before the sintering and by means of the grinding disc 52 is, however, to be preferred since at this point in time the sintered material 41 can still be processed relatively easily.

Figure 14:
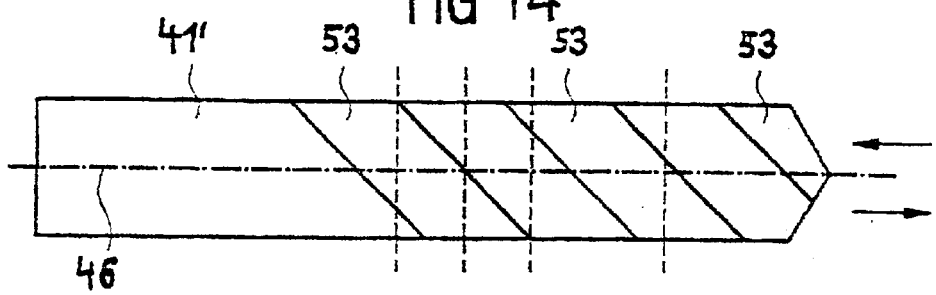
FIG. 14 shows a sintered rod from the side.

FIG. 14 now shows the sintered rod 41' after its further processing into a drill blank, from one side. As apparent, it has two chip spaces 53 which run in helical form around the rod axis 46.

Figure 15:
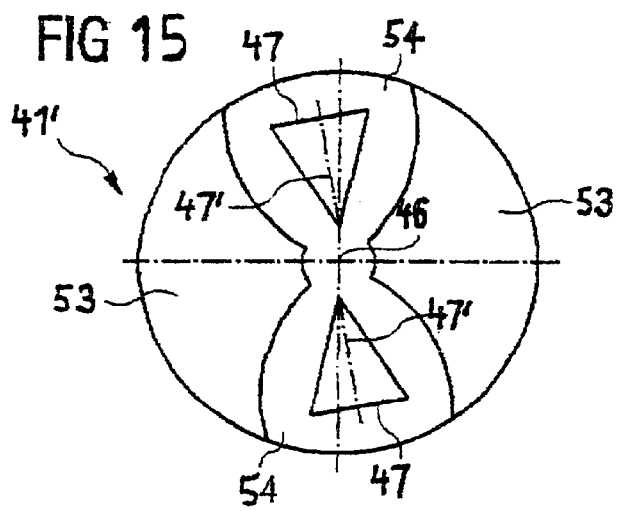
FIG. 15 shows the sintered rod of FIG. 14 in cross-section.

FIG. 15 now shows a cross-section along one of the dashed lines in FIG. 14. The cross-section is always the same. As apparent, the chip spaces 53 were therefore formed in the dried sintered material 41 or in the sintered rod 41' in such a manner that the channels 45 extend substantially parallel to the boundaries to the chip spaces 53 as seen in the rod cross-section. In addition, since the cross-section is independent of the location at which it was undertaken, the channels 45 necessarily also run with a constant inclination helically about the rod axis 46. The channel cross-sections remain unchanged relative to the illustration according to FIG. 10. They are thus again triangular, thus, in particular, non-circular. Moreover, neither their outer edges 47 nor their longitudinal axes 47' extend concentrically to the rod axis 46.

As apparent, the drill blank 41' has two chip spaces 53 and two rod fields 54 arranged between the chip spaces 53. The drill blank 41' has one channel 45 for each rod field 54. The two channels 45 are in that case, as evident, formed to be the same.

Figure 16:
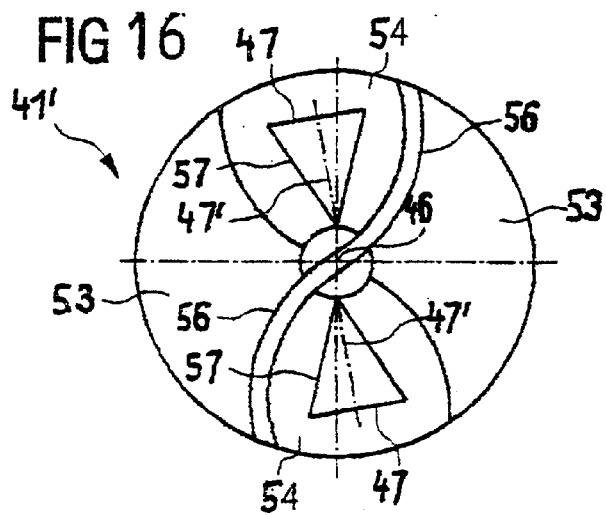
FIG. 16 shows the sintered rod of FIG. 15 from the front.

FIG. 16 now shows the drill blank 41' from the front, thus from the direction of the arrows according to FIG. 14. According to FIG. 16 the drill blank 41' has two cutting edges 56 at its tip. In addition, the channels 45 extend substantially parallel to the cutting edges 56 as seen in the cross-section. Stated more specifically, they have side edges 57 which extend substantially parallel to the cutting edges 56.

By virtue of the shape of the channels 45 in accordance with the invention an enlarged channel cross-section results by comparison with the state of the art. A higher throughput of a medium through the channels 45 is thus achievable. Moreover, the cutting edges 56 can in operation be acted on by the medium over almost their entire length. Cooling, lubrication of the drill and discharge of drilling chips are thus optimised.

What is claimed is:

1. Method of producing a substantially circularly cylindrical body which consists of a plastic material and which has at least one helical internal recess extending in the interior of the body, said method comprising initially producing the body with a substantially rectilinear course of the internal recess and the body cut to a defined length is subsequently subjected, whilst supported over its entire length on a support, by a friction surface arrangement to a rolling motion, the speed of which changes linearly and constantly over the length of the body whereby the body is uniformly twisted.

2. Method according to claim 1, wherein the body is linearly supported during the twisting.

3. Method according to claim 2, wherein the friction surface arrangement engages the body along a line diametrally offset relative to the line of support on the support.

4. Method according to claim 1, wherein the body is supported over an area during the twisting.

5. Method according to claim 4, wherein the friction surface arrangement is coincident with the support and the rolling motion is effected by the gravitational force of the body in that the support is moved away under the body in such a manner that the displacement between the support and the body extends linearly over the length thereof and is zero in the centre of the body.

6. Method according to claim 1, wherein the cross-section of the internal recess is non-circular and the internal recess has an outer edge which extends non-concentrically relative to the axis of the circularly cylindrical body, wherein a longitudinal axis of the channel equally extends non-concentrically relative to the axis of the circularly cylindrical body.

7. Method according to claim 1, wherein the twisted body is sintered to be a sintered rod.

8. Method according to claim 7, wherein the sintered material is dried before the sintering and at least one tooth space is formed into the dried sintered material.

9. Method according to claim 7, wherein at least one tooth space is formed in the sintered rod after the sintering.

10. Method according to claim 8, wherein the tooth space is formed in the dried sintered material or in the sintered rod in such a manner that the internal recess extends substantially parallel to the boundary to the tooth space as seen in cross-section.

11. Method according to claim 1, wherein a plurality of identically formed internal recesses arranged offset relative to the rod axis by a rotational angle are formed in the sintered material during the extruding.

12. Device for carrying out the method according to claim 1, further comprising a support for supporting the body over the entire length thereof, a friction surface arrangement engaging the body similarly over the entire length thereof and a drive device by which at least one of the support and the friction surface arrangement is subjected to a movement which induces at the body a rolling motion, the speed of which changes constantly and linearly over the length of the body.

13. Device according to claim 12, wherein the support is formed by a planar surface and the friction surface arrangement has a surface disposed at a parallel spacing from the support, wherein the drive device is a rotary drive device by which a relative rotational movement can be produced between the support and the friction surface arrangement with respect to an axis of rotation which extends perpendicularly to the support and intersects the longitudinal axis of the body.

14. Device according to claim 13, wherein the surface of the friction surface arrangement is formed by a circle-segment disc.

15. Device according to claim 12, wherein the support is coincident with the friction surface arrangement and is formed by a flexible surface which loops around the body at least in a section and adapts to the body and which is coupled with the drive device in such a manner that the tangential movement, which extends perpendicularly to a plane extending through the longitudinal axis of the body, of the surface changes constantly and linearly over the length of the body.

16. Device according to claim 15, wherein the tangential movement of the surface is zero in the region of the centre of the body.

17. Device according to claim 15, wherein the surface adapting to the body is formed by one of a film material and a textile material which loops around the body over an angular range of 180°.

18. Device according to claim 17, wherein the body is carried in suspended manner by the one of the film material and the textile material.

19. Device according to claim 15, wherein the surface is composed of a plurality of part surfaces which are disposed in a line axially along the axis of the body and between each of which is disposed a respective gap.

20. Device according to claim 19, wherein the part surfaces are interconnected by way of webs at the edge.

21. Device according to claim 17, wherein the drive device engages the side edges of the film material or textile material.

22. Device according to claim 20, wherein the drive device engages the corners of the one of the film material and the textile material.

23. Device according to claim 17, wherein the drive device comprises program-controlled motors.

24. Method according to claim 1, wherein the body is a sintered metal blank.

25. Method according to claim 1, wherein the body is initially produced by extrusion.

* * * * *